United States Patent [19]

Vriens et al.

[11] Patent Number: 4,990,824

[45] Date of Patent: Feb. 5, 1991

[54] COLOR CATHODE RAY TUBE HAVING INTERFERENCE FILTER WITH DIFFERENT PASS BANDS

[75] Inventors: Leendert Vriens; Johannes C. N. Rijpers, both of Eindhoven, Netherlands; Albert A. Comberg, Aachen, Fed. Rep. of Germany; Johannes H. M. Wilting, Eindhoven, Netherlands; Aart A. Van Gorkum, Eindhoven, Netherlands; Franciscus A. Vollenbroek, Eindhoven, Netherlands

[73] Assignee: U.S. Philips Corporation, New York, N.Y.

[21] Appl. No.: 175,997

[22] Filed: Mar. 31, 1988

[30] Foreign Application Priority Data

Apr. 3, 1987 [GB] United Kingdom ................. 8707975

[51] Int. Cl.[5] ................................................ H04N 5/72

[52] U.S. Cl. .................................... 313/474; 313/466; 358/250; 358/253; 350/311; 350/317

[58] Field of Search ............... 313/474, 470, 471, 473, 313/466; 358/250, 253; 350/311, 314, 317

[56] References Cited

U.S. PATENT DOCUMENTS

| | | | |
|---|---|---|---|
| 2,657,331 | 10/1953 | Parker | 313/471 X |
| 2,728,026 | 12/1955 | van Overbeck | 313/421 X |
| 3,748,515 | 7/1973 | Kaplan | 313/474 X |
| 4,683,398 | 7/1987 | Vriens et al. | 313/112 X |

FOREIGN PATENT DOCUMENTS

| | | | |
|---|---|---|---|
| 170320 | 2/1986 | European Pat. Off. | 313/474 |
| 148473 | 11/1979 | Japan | 313/474 |

*Primary Examiner*—Donald J. Yusko
*Assistant Examiner*—Michael Horabik
*Attorney, Agent, or Firm*—John C. Fox

[57] ABSTRACT

A color cathode ray tube of the shadow mask or beam index type in which the screen structure applied to the faceplate has a plurality of triplets of optical interference filter stripes which are adapted to pass red (R), green (G) and blue (B) light produced by a homogeneous cathodoluminescent screen layer. The usual aluminium layer may be applied to the screen layer. The optical interference filter stripes may have short wave pass filters, band pass filters or a combination of both types. The short wave pass filter stripes may have modified quarter wavelength multilayer dielectric filters and the bandpass filter may have a Fabry-Perot filter.

18 Claims, 4 Drawing Sheets

COLOR CATHODE RAY TUBE HAVING INTERFERENCE FILTER WITH DIFFERENT PASS BANDS

BACKGROUND OF THE INVENTION

The present invention relates to a colour cathode ray tube, more particularly to a colour cathode ray tube in which optical filters are used to produce visible signals. The present invention is applicable to shadow mask tubes, particularly Datagraphic Display (DGD tubes), beam index tubes and other types of tubes in which previously a coloured image has been produced by elements which luminesce in different colours in response to electron beam impingement.

U.S. Pat. Nos. 4,634,926; 4,647,812 and 4,683,398 disclose a projection television apparatus in which multilayer optical interference filters are used to enhance the light output. In such an apparatus, which comprises three cathode ray tubes having screens luminescing in red, green and blue respectively, the phosphors are preferably selected to have line spectra, and the optical interference filter is disposed between the phosphor and the faceplate. The optical interference filter, which comprises a short wave pass filter, is formed by a plurality of layers manufactured alternately from a material having a high refractive index (H) and a material having a low refractive index (L). The filter has between 6 and 30 layers, and preferably between 14 and 22 layers, each having an optical thickness nd, wherein n is the refractive index of the material of the layer and d is the thickness, said optical thickness nd being between $0.2\lambda_f$ and $0.3\lambda_f$, in which $\lambda_f$ is equal to $p\times\lambda$, where $\lambda$ is the desired central wavelength selected from the spectrum emitted by the luminescent material and p is a number between 1.18 and 1.36.

Striped optical filters are known per se. For example, an article "Striped Optical Filters Composed of Multi-Layered $TiO_2$ and $SiO_2$ Films Deposited By RF Sputtering" by Y. Shimomoto, Y. Imamura, A. Sasano and E. Maruyama Surface Science 86(1979) pp. 417 to 423, discloses making striped optical filters (cyan, magenta and yellow) for compact pick-up tubes using a multilayer RF sputtering apparatus. These filters are made of 13 layers of $TiO_2$ and $SiO_2$, with refractive indices (n) of 2.50 and 1.47, respectively, at 546.1 nm. The cyan (red) filter is $(L.H)^6L/2$; the magenta (green) is $(3H.L)^5\,3H\,\frac{1}{2}$ and the yellow filter (blue) is $(H/2, L, H/2)^6$, where L and H respectively represent low and high refractive index layers with an optical thickness which equals $0.25\lambda_o$, where $\lambda_o$ is the centre wavelength of the filter. The filters are small, having a pitch, length and number of stripes of 20 μm, 10 mm and about 700 lines, respectively. There is no suggestion of providing such optical filters on larger substrates.

Shadow mask colour cathode ray tubes for use in DGD applications have a number of requirements including: realising the smallest possible spot on the display screen to obtain a high resolving power; a high luminance in connection with a high contrast with respect to colour and location, and homogeneous controllability over the entire display screen, free from blending and flickering. Additionally, it is desirable for the decay time of the cathodoluminescent screen to be sufficiently short, and also for the X-ray emissions not to exceed the amounts legally stipulated.

The advantages alleged for a beam index colour cathode ray tube over a shadow mask tube are well documented and will not be listed here. However beam index tubes have a number of drawbacks such as, the necessity (so far) of providing extra black stripes and an ultra-violet phosphor between the red, green and blue phosphors; the necessity of making an electron beam spot smaller than the phosphor stripe width, that is an oval beam spot, which leads to a limitation of the beam current and thereby the brightness; the necessity of using impregnated cathodes, and the necessity of detecting ultra-violet light and of high-frequency correction as well as high-frequency switching (5 to 10 MHz) between red, green, blue and ultra-violet.

It is an object of the present invention to mitigate some of these problems in colour cathode ray tubes.

SUMMARY OF THE INVENTION

According to the present invention there is provided a colour cathode ray tube comprising an envelope having a faceplate, an optical interference filter on the internal surface of the faceplate and a cathodoluminescent layer covering the interference filter, characterised in that the optical interference filter comprises contiguous areas having different optical pass bands.

The colour cathode ray tube made in accordance with the present invention can be adapted for use as a shadow mask tube by the inclusion of a shadow mask adjacent to, but spaced from, the faceplate, and providing a triple beam electron gun. Alternatively, the colour cathode ray tube can be adapted for use as a beam index tube by, providing for example, ultra-violet light emitting index stripes on the cathodoluminescent layer, a detector comprising a photomultiplier tube, a scan velocity modulation coil in the deflection yoke and suitable circuitry.

The use of such a screen structure in a shadow mask cathode ray tube enables a gain in light output to be obtained in the direction of the viewer, without the necessity of increasing the density of the exciting electron beams. A single structure of a homogeneous cathodoluminescent material can be used as the screen. This aspect coupled with a shadow mask enables well-proven circuitry to be used. Problems of colour distortion caused by contamination of one phosphor material by a subsequently deposited phosphor material are avoided. Finally, as the contiguous areas, for example stripes, of the optical interference filter can be made to a smaller pitch, a higher resolution is obtainable compared to a striped phosphor screen.

Some of the mentioned benefits are also applicable to beam index colour cathode ray tubes. Additionally there is no need to provide four separate phosphors and inter-positioned black separation bands. Also, if a multiple spot electron gun is provided, then the necessary limiting of the electron beam current to avoid spot blow-up (leading to colour errors) is no longer applicable.

The optical interference filter may comprise contiguous stripes, each formed as a modified quarter wavelength multi-layer dielectric filter, to function as a short pass filter, or it may comprise a Fabry-Perot filter which has contiguous areas tuned, for example by etching, to pass light having wavelengths in a predetermined passband. If desired, a combination of short pass and band pass filters may be used. For example, the red or red and green filter stripes may be of a band pass type, and the green and blue or the blue filter stripes may be of a short pass type.

BRIEF DESCRIPTION OF THE DRAWINGS

The present invention will now be described, by way of example, with reference to the accompanying drawings, wherein.

In the drawings, the same reference numerals have been used to indicate corresponding features. Additionally it should be noted that the drawings are not to scale.

DESCRIPTION OF THE PREFERRED EMBODIMENTS

Figure 1:
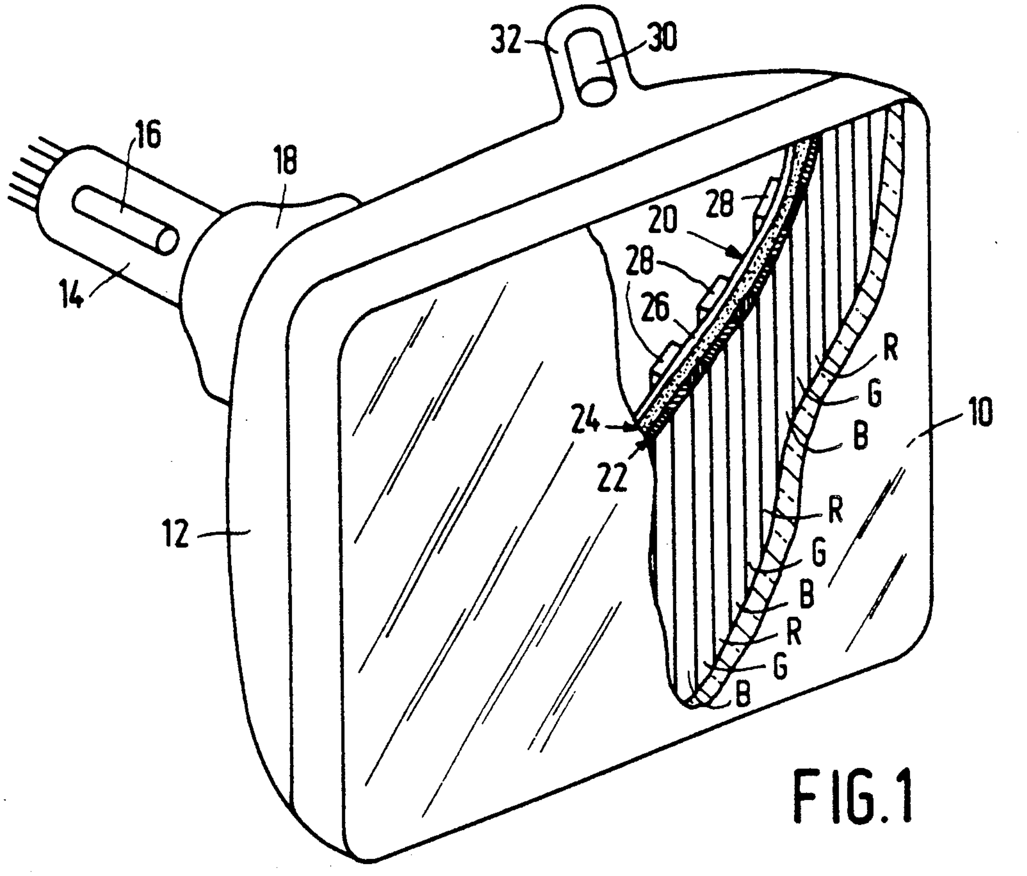
FIG. 1 is a diagrammatic perspective view of a beam index colour cathode ray tube with part of the faceplate broken away.

The beam index colour cathode ray tube shown in FIG. 1 comprises an envelope formed by an optically transparent faceplate 10, a cone 12 and a neck 14. An electron gun 16 is located in the neck 14 and the electron beam produced by the electron gun 16 is scanned over a screen structure 20 carried by the faceplate 10 by deflection coils 18. The screen structure 20 comprises an optical interference filter 22, a cathodoluminescent layer 24, an aluminium layer 26 and ultra-violet index signal-emitting strips 28. An ultra-violet light detector 30, for example a photomultiplier tube, is mounted in a tubular housing 32 formed in the cone. The detected ultra-violet light signals are used to synchronise the information to be displayed with the scanning of the electron beam. The deflection coils 18 include a scan velocity modulation coil for adjusting the electron beam scanning. As the operation of a beam index cathode ray tube is generally known, it will not be described herein.

The screen structure 20 is of interest because instead of comprising triads of phosphors, it comprises the layer 24, which has a broad emission spectrum in response to electron beam impingement, covering red, green and blue light, and the optical interference filter 22 which in the illustrated embodiment comprises contiguous stripes capable of passing red (R), blue (B) and green (G) light components present in the light produced by the layer 24.

Figure 2:
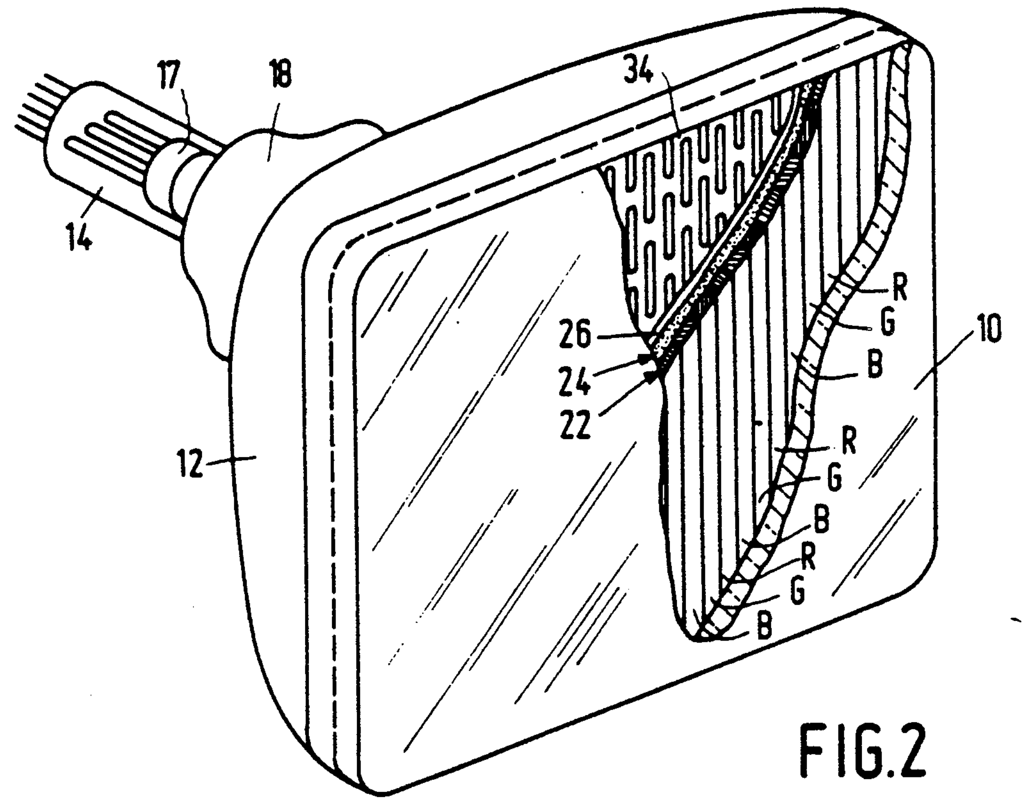
FIG. 2 is a diagrammatic perspective view of a shadow mask colour cathode ray tube with part of the faceplate broken away.

The shadow mask colour cathode ray tube shown in FIG. 2 comprises elements similar to the beam index tube of FIG. 1, except that an in-line triple electron beam arrangement 17 replaces gun 16 and a shadow mask 34 mounted adjacent to, but spaced from, the screen structure 20 replaces index stripes 28 and detector 30. As the operation of a shadow mask tube is well-known, in the interests of brevity it will not be described in the present specification.

The optical interference filter 22 comprises filter stripes, and the optical characteristics of all the red strips (R) are substantially the same, as are the characteristics of the green (G) and blue (B) stripes. Consequently, the filter 22 may be considered to comprise three interlaced filters. The filter 22 may comprise various combinations of filters, for example: (1) short wave pass filters for the blue and green light emissions with a band pass filter for the red: (2) a short wave pass filter for the blue with band pass filters for the green and red light emission: or (3) band pass filters for all three colours. The short wave pass filters are for example, modified quarter wavelength multi-layer dielectric filters as described for example in U.S. Pat. No. 4,634,926. Fabry-Perot filters may be chosen as band pass filters. Band pass filters transmit more monochromatic light so that a higher color parity may then be attained.

Figure 3:
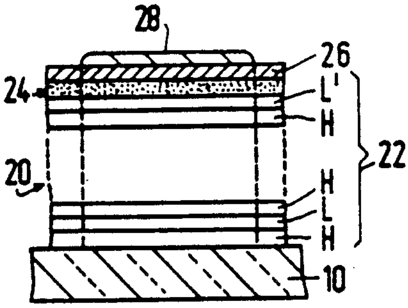
FIG. 3 is a diagrammatic horizontal cross-sectional view of a portion of the faceplate structure shown in FIG. 1.

FIG. 3 illustrates an example of the screen structure 20, which comprises triplets of modified quarter wavelength multi-layer dielectric filters. For convenience only one filter stripe will be described.

The filter stripe comprises between 6 and 30 layers, preferably 10 to 20 layers, of alternately arranged high (H) refractive index material, for example $TiO_2$ (refractive index n=2.35), and low refractive index material, for example $SiO_2$ (n=1.47). Each layer has an optical thickness nd, wherein n is the refractive index of the material of the layer and d is the thickness. The optical thickness nd lies between $0.2\lambda_f$ and $0.3\lambda_f$, preferably between $0.23\lambda_f$ and $0.27\lambda_f$, wherein $\lambda_f$ is equal to $p\times\lambda$, in which $\lambda$ is the desired central wavelength selected from the spectrum emitted by the cathodoluminescent layer 24 and p is a number between 1.18 and 1.36. The average optical thickness is $0.25\lambda_f$, and $\lambda_f$ is the central wavelength of the filter strip. In the case of using $TiO_2$ and $SiO_2$, $p=\lambda_f/\lambda$ and lies between 1.22 and 1.36. As shown in FIG. 3, the first and last layers of the filter stripe proper should be of a material having a high refractive index, n, and an outer terminating layer L' is provided and has a thickness of approximately half that of the other layers. The terminating layer increases the transmission in the forward direction for light rays which enclose small angles to the normal and reduces oscillations in the transmissions.

In the case of the filter stripe passing green light, assuming a central wavelength $\lambda$ of 545 nm and a value of p between 1.22 and 1.27, then $\lambda_f$ is between 660 nm and 690 nm. The filter so formed has a high transmission (exceeding 90%) for light rays which make an angle smaller than 20° to 35° to the normal on the filter. For light rays which make an angle larger than 25° to 40° to the normal on the filter, the transmission declines rapidly and reflection occurs up to 90°. After scattering in the luminescent material, the reflected light has a chance to emanate from the tube within an angle of 18° to 30° to the normal on the filter. As a result of this, a gain in luminous efficiency occurs in the forward direction for the wavelengths selected by the respective filters. Within a limited viewing angle of (half angle of 20° to 35°) one thus obtains the chosen colours and simultaneously a gain in luminance for these colours.

An illustrative filter, assuming $\lambda = 545$ nm, $p = 1.25$ so that $\lambda_f$ becomes equal to 680 nm, is composed as recorded in the following table.

| Layer No. | n | n.d./$\lambda_f$ |
|---|---|---|
| Phosphor | | |
| 1 | L | 0.131 |
| 2 | H | 0.260 |
| 3 | L | 0.255 |
| 4 | H | 0.251 |
| 5 | L | 0.248 |
| 6 | H | 0.246 |
| 7 | L | 0.244 |
| 8 | H | 0.243 |
| 9 | L | 0.244 |
| 10 | H | 0.246 |
| 11 | L | 0.248 |
| 12 | H | 0.251 |
| 13 | L | 0.255 |
| 14 | H | 0.260 |
| Display window | 1.57 | |

For passing blue light, $\lambda$ will be assumed to be 460 nm. Thus with a value of p between 1.22 and 1.27, $\lambda_f$ is between 560 nm and 790 nm.

The choice of materials for use as the filter layers is governed by a number of factors such as resistance to tube processing, which includes firing at 460° C. $SiO_2$—$TiO_2$ multilayer filters are particularly suitable for this purpose, especially if annealed immediately after being deposited.

Figure 9:
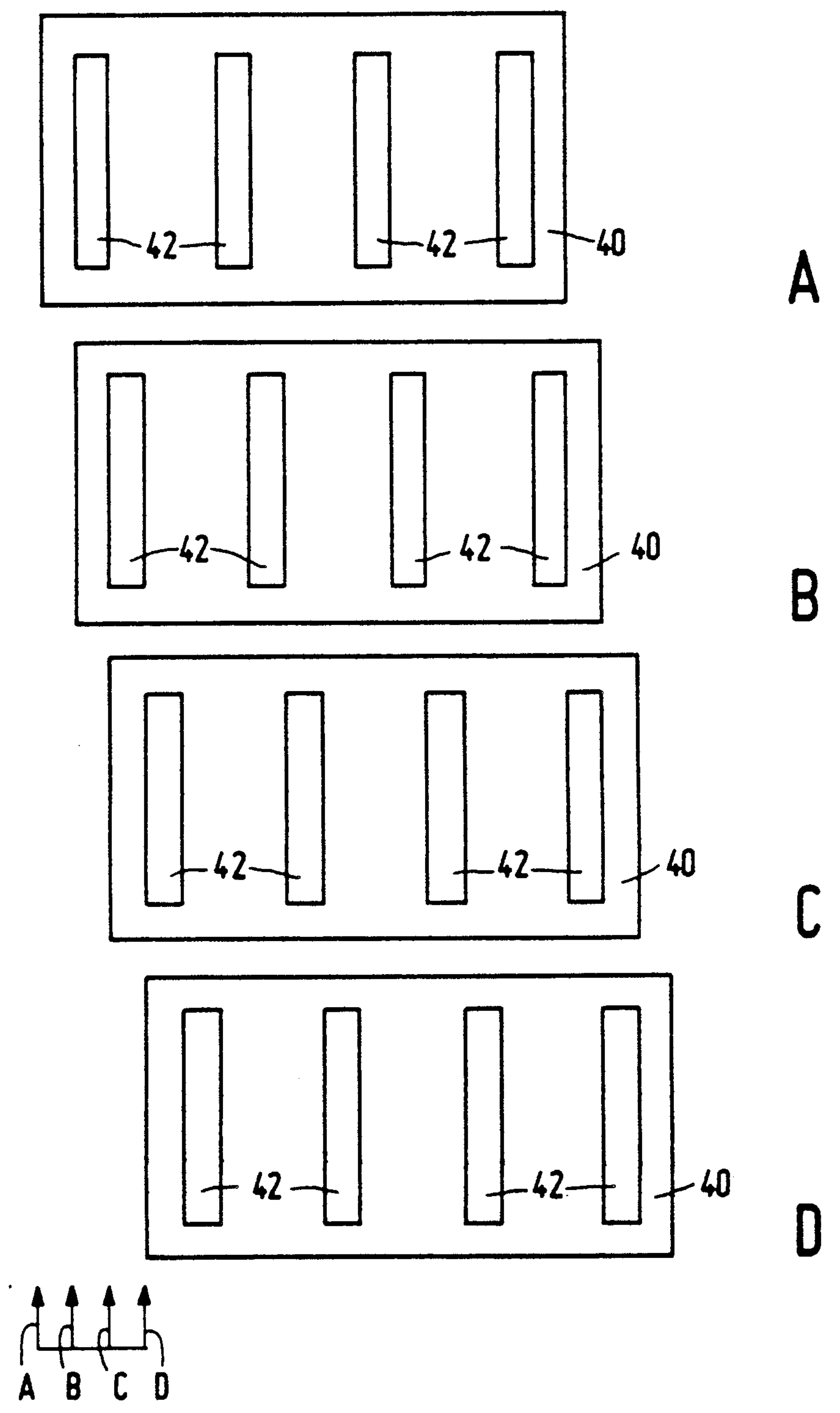
FIG. 9 illustrates diagrammatically the different positions of an etching mask for producing an optical interference filter of the type shown in FIG. 3.

The stripe pattern on the faceplate may be formed by vacuum evaporation through a mask 40 (FIG. 9) to provide three interference filters (red, green and blue) or four filters if a black filter is required. Typically the width of the interference filter stripes may be between 100 μm and 600 μm dependent on their use, but they may be smaller or larger if required. Thus, assuming a stripe width of 150 μm, slots 42 in the evaporation mask are of this width.

Assuming that all the different filter stripes have the same number of layers, each layer has a thickness which varies from one type of filter stripe to another type of filter stripe, the thicknesses being substantially the same, layer for layer, in stripes of the same type, for example all the green filter stripes. The deposition of some or all the filter stripes can be carried-out during one pump down of the vacuum evaporation apparatus.

The transmission of the mask 40 is determined according to the number of types of interference stripes to be vacuum evaporated, that is 33% for 3 types of stripes and 25% for 4 types of stripes. Thus, vacuum evaporation of $TiO_2$ through the slots can proceed with the mask in position A in FIG. 9. Once the required thickness has been deposited, the mask 40 is shifted laterally by the width of a slot 42 to position B in FIG. 9, and a further deposition of $TiO_2$ takes place. The process continues with the mask 40 being successively moved to positions C and D. The result is quartets of contiguous edge-to-edge arranged $TiO_2$ layers, the thicknesses of which have been predetermined. By returning the mask to position A in FIG. 9, the cycle is repeated using $SiO_2$. Once all the filter layers have been deposited they may be annealed, and the faceplate 10 is ready for deposition of the cathodoluminescent material.

Figure 4:
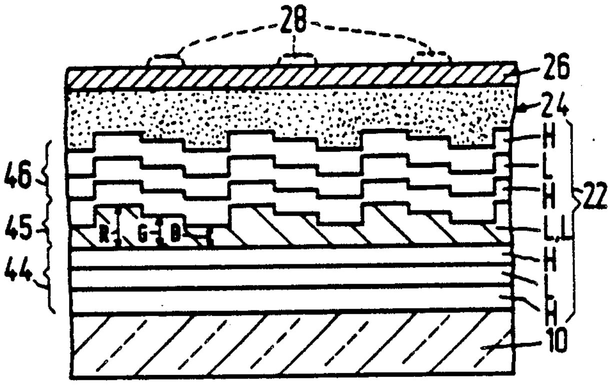
FIG. 4 is a diagrammatic horizontal cross-sectional view of a portion of a faceplate structure in which the optical interference filter is a Fabry-Perot filter having contiguous areas adapted to pass different frequency bands.

FIG. 4 illustrates a screen structure which comprises Fabry-Perot band pass filters for red, green and blue. As is known, Fabry-Perot filters comprise two reflective parts 44, 46 of an HLH type, which sandwich an L,L intermediate part 45. Each outer HLH part comprises approximately quarter-wave layers, and the intermediate part L,L has a thickness of $\lambda/2$. The passband of the filter is tuned by carefully controlling the thickness of the intermediate part 45.

Fabry-Perot filters as shown in FIG. 4 can be produced by either of the following methods:

FIRST METHOD

A homogeneous, broadband HLH dielectric multilayer (reflector), part 44, is evaporated on the inside of the faceplate 10. An L,L $SiO_2$ layer, part 45, is then provided, the thickness of the layer having the value of $\lambda/2$ for the color having larges $\lambda$ being for example, for red R, 612 nm. The faceplate 10 is removed from the evaporation apparatus and is coated with a photolacquer. A mask, in this instance the shadow mask 34, is disposed in the faceplate 10. As is customary when making striped cathodoluminescent screens, the light source, shadow mask and any intermediate optical systems are adjusted relative to each other in such a way that the light path corresponds to the electron beam path for the corresponding colour, in this case green. The photolacquer is then exposed through the shadow mask 10 and developed to generate a structure corresponding to the interference filter stripes of the first and third colours, for example, red and blue. After the photolacquer is developed, the exposed part of the $SiO_2$ layer is etched so that the remaining thickness corresponds to $\lambda/2$ for the second colour, in this case green, G. The cycle of coating with photolacquer, exposing through the shadow mask, developing and etching is repeated so that the remaining thickness corresponds to $\lambda/2$ for the third colour, for example the blue colour B. Finally, the aperture mask is removed and the faceplate with the partially completed filter stripes is returned to the evaporation apparatus and the second broadband dielectric multilayer part 46 is applied to complete the filter.

If it is desired to broaden the bandwith of the Fabry-Perot filter by applying a second filter, the entire cycle is repeated after a coupling, $\lambda/4$ low refractive index layer (L) is applied. In the second filter the thickness of the tunable layer (part 45) is varied slightly but otherwise the stack has the same thickness variation as the first filter stack.

The cathodoluminescent layer 24 can be applied to the optical interference filter 22 by techniques such as sedimentation, electrophoresis, electrophotographic deposition or deposition using organic binders.

SECOND METHOD

The main differences from the first method occur after the required thickness, that is a thickness corresponding to $\lambda/2$ for red light, of the $SiO_2$ layer has been applied to the HLH stack 44 (FIG. 4). Photolacquer is applied and is exposed through a mask such that in the subsequent etching operation stripes having a width for green and blue combined are etched so that the remaining thickness corresponds to $\lambda/2$ for green light. Thereafter photolacquer is reapplied and is exposed through a mask such that in the subsequent etching operation stripes having the width for blue are etched so that the remaining thickness corresponds to $\lambda/2$ for blue light. The process then continues as in the first method. An advantage of the second method over the first method is that the time to etch the $SiO_2$ layer for the blue stripes is less.

Figure 5:
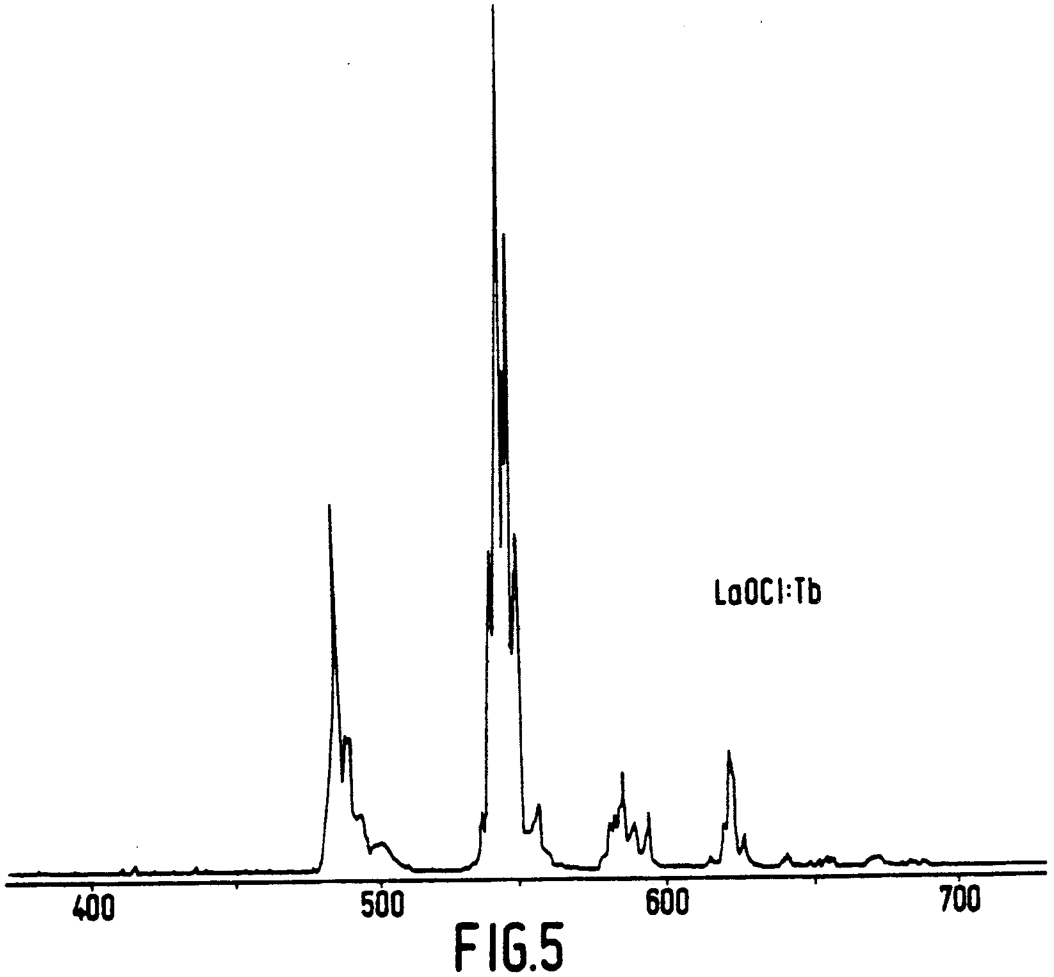
FIG. 5 is a diagram of the spectrum of a LaOCl:Tb broadband phosphor.

The choice of materials for the layer 24 depends on the required optical performance. Phosphors which emit a plurality of spectral lines include LaOCl:Tb; LaOBr:Tb; $Gd_2O_2S$:Tb; $Y_2O_2S$:Tb, $Y_2SiO_5$:Tb and YAG:Tb. A representative spectrum of a LaOCl:Tb is shown in FIG. 5. The intensity ratio between green and blue depends on the host lattice and can be adjusted by altering the Tb concentration. The intensity ratio of the orange/red spectral lines of these Tb phosphors also depends on the host lattice. It will thus be possible to (1) obtain with one phosphor the correct ratio between blue, green and red (for DGD tubes the requirements may be less strict than for domestic colour cathode ray tubes); (2) obtain the correct blue-green-red ratio by admixing a red phosphor such as $Y_2O_2S$:Eu or $Y_2O_3$:Eu; or (3) obtain a surface layer emitting more red by, for example, a penetronlike surface treatment of the Tb phosphor so that the correct colour ratio is achieved (at one accelerating voltage).

It is also possible to mix both the red and the blue (for example ZnS:Ag) phosphors with an optimized green (line) phosphor. In all cases the result is that a three-colour cathode ray tube is obtained with a stripe interference filter having only one homogeneous cathodoluminescent layer 24 and as usual, the aluminium backing layer 26. Each of the respective blue, green and red interference filters may be chosen such that it substantially transmits only one of the colors. A high color purity may then be attained. A simpler version is a two-colour cathode ray tube with a two-colour (plus possibly black) stripe optical interference filter 22 and only one phosphor which mainly emits, for example, two spectral lines.

Figure 6:
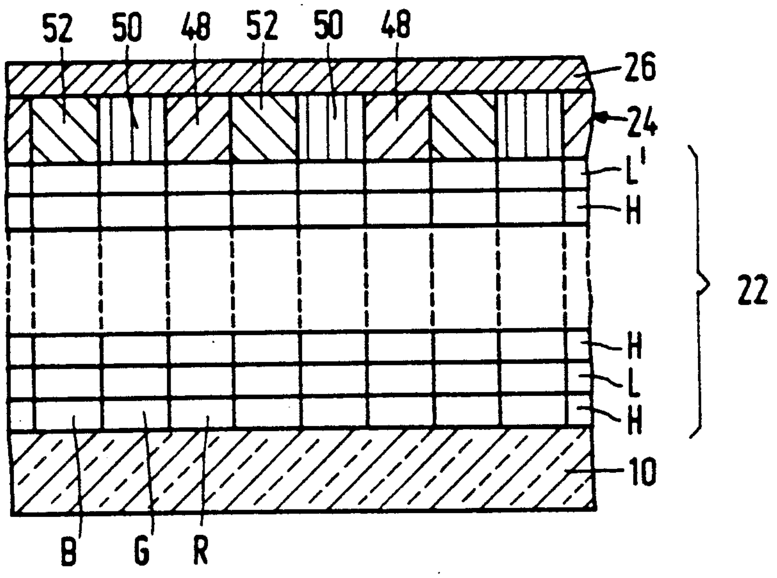
FIG. 6 is a diagrammatic horizontal cross-sectional view of a faceplate structure in which the cathodoluminescent layer comprises contiguous phosphor stripes.

FIG. 6 illustrates a high performance tube in which both a striped optical interference filter 22 and a cathodoluminescent layer 24 comprising separate phosphor stripes 48, 50 and 52 are used.

Figure 7:
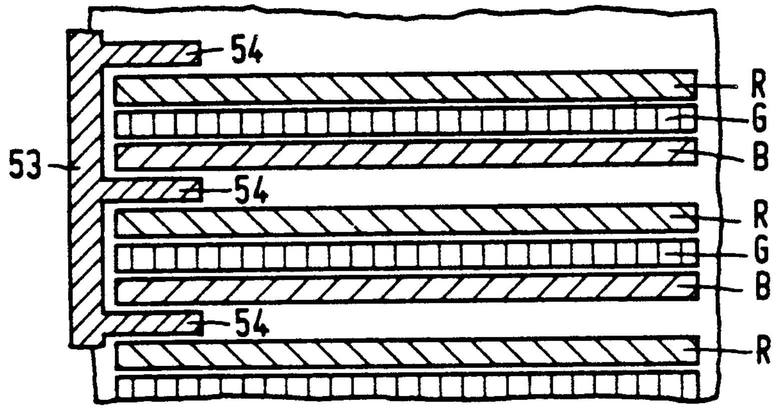
FIGS. 7 and 8 illustrate two alternative embodiments in which the optical interference filter strips are horizontal.
Figure 8:
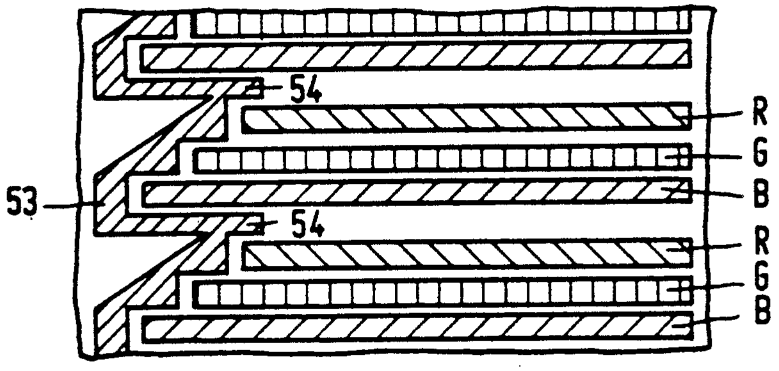

As a variant of the beam index colour cathode ray tube shown in FIG. 1, the interference filter stripes R, G, B extend horizontally rather than vertically. Vertical indexing stripes 28 and scan velocity modulation coils are not required. However height control is necessary to ensure that the electron beam (or electron beams) correctly scan the stripes. This control can be enabled by providing reference indicia such as a comb shaped electrode 53 along one edge of the screen as shown in FIGS. 7 and 8. Such an electrode 53, which is known per se from U.S. Pat. No. 4,685,891, details of which are incorporated herein by reference, is connected to a line scanning circuit. In FIG. 7 the electrode 53 comprises substantially equal length teeth 54 at a pitch of one per filter triplet. At the commencement of the scan of each triplet, a line scanning circuit is activated and, depending on the amplitude of the index signal derived from the electrode 53, appropriate height adjustment of the scanning beam is effected by way of the deflection coils 18, which may include an additional coil for this specific purpose. The amplitude of the index signal is large if the electron beam passes along a tooth 54, small if it misses completely the tooth 54 and passes across the vertical part of the electrode 53 bridging adjacent teeth 54, and somewhere between the large and small values if the electron beam partially overlaps a tooth 54.

The arrangement shown in FIG. 8 is a refinement of that shown in FIG. 7. The part of the comb-shaped electrode 53 bridging the teeth 54 is stepped on the side adjacent the filter stripes R, G and B. By this technique height control can be applied to each line individually because the timing of the occurrence of each index signal will identify whether the electron beam is scanning a red R, a green G or a blue B line.

In an alternative technique to that illustrated in FIGS. 7 and 8, the photomultiplier tube 30 (FIG. 1) can be arranged to detect light from a phosphor provided along the vertical marginal areas of aluminium layer 26. A ZnS:Ag phosphor is useful for this purpose because it has a rapid decay time of the order of 25 $\mu$S.

Although horizontal scanning can be achieved using a single electron beam, the modulation rate has to be of the order of 13 MHZ which, because of the inherent capacitances, is not easily achieved. A better alternative is to provide three vertically separated electron beams which can be modulated and controlled individually. This can conveniently be done using a multispot electron gun such as is described in U.S. patent application Ser. No. 256,107 filed Oct. 11, 1988, details of which are incorporated by reference.

A multiple spot electron gun may also be used in colour cathode ray tube having vertical interference filter stripes. One advantage is that it is possible to reduce the beam current and thereby be able to achieve a smaller spot, preferably of circular cross section. If desired the electron gun may comprise an array of p-n emitters.

What is claimed is:

1. A colour cathode ray tube comprising an envelope having a faceplate, an optical multilayer interference filter having a high transmission for light rays which make an angle smaller than 20°-35° to the normal on the filter on the internal surface of the faceplate and a cathodoluminescent layer covering the interference filter, characterised in that the optical interference filter comprises contiguously arranged stripe-like modified quarter wavelength multi-layer dielectric filter elements adapted to pass red, green and blue light produced by the cathodoluminescent layer, in that the filter elements for blue and green light respectively comprise short wave pass filters, and in that the filter elements for red light comprise band pass filters.

2. A cathode ray tube as claimed in claim 1, in which the band pass filter elements comprise Fabry-Perot filters.

3. A cathode ray tube as claimed in claim 1, in which the short wave pass filters comprise between 6 and 30 layers each having an optical thickness nd, wherein n is the refractive index of the material of the layer and d is the thickness, said optical thickness nd being between $0.2\lambda_f$ and $0.3\lambda_f$, in which $\lambda_f$ is equal to $p \times \lambda$, where $\lambda$ is the desired central wavelength selected from the spectrum emitted by the luminescent material and p is a number between 1.18 and 1.36.

4. A cathode ray tube as claimed in claim 3, in which the short wave pass filters comprise between 10 and 20 layers.

5. A cathode ray tube as claimed in claim 1, in which the cathodoluminescent layer comprises a homogeneous broadband luminescent material.

6. A cathode ray tube as claimed in claim 1, in which the cathodoluminescent layer comprises a plurality of triplets of different colour emitting stripes.

7. A cathode ray tube as claimed in claim 6, in which said contiguous areas comprise stripes and in that the colour emitting stripes extend parallel to said stripes of the optical interference filter.

8. A cathode ray tube as claimed in claim 5, in which said contiguous areas comprise stripes which extend in the line scanning direction.

9. A cathode ray tube as claimed in claim 5, in which an aluminum layer is provided on the cathodoluminescent layer.

10. A cathode ray tube as claimed in claim 9, in which a colour selection electrode (or shadow mask) is provided within the envelope adjacent to, but spaced from, the faceplate.

11. A cathode ray tube as claimed in claim 7, in which an aluminum layer is provided on the cathodoluminescent layer, and index signal emitting strips are provided on the aluminum layer, said index signal emitting strips extending substantially parallel to the strips of the optical interference filter, and in that means are provided for detecting the index signals.

12. A cathode ray tube as claimed in claim 8, in which indicia are provided on the marginal area of the faceplate for producing signals indicative of the position of at least one electron beam scanning the cathodoluminescent layer.

13. A cathode ray tube as claimed in claim 10, in which a single beam electron gun is provided within the envelope.

14. A cathode ray tube as claimed in claim 1, in which means are provided within the envelope for producing a plurality of electron beams.

15. A cathode ray tube as claimed in claim 14, in which said means comprise an array of p-n emitters.

16. A colour cathode ray tube comprising an envelope having a faceplate, an optical multilayer interference filter having a high transmission for light rays which make an angle smaller than 20°–35° to the normal on the filter on the internal surface of the faceplate and a cathodoluminescent layer covering the interference filter, characterized in which the optical interference filter comprises contiguously arranged stripe-like multilayer dielectric filter elements adapted to pass red, green and blue light produced by the cathodoluminescent layer, in that the filter elements for the blue light comprise short wave pass filters and in that the filter elements for green and red light respectively comprises band pass filters.

17. A cathode ray tube as claimed in claim 16, in which the band pass filter elements comprise Fabry-Perot filters.

18. A cathode ray tube as claimed in claim 16, in which the short wave pass filters comprise between 6 and 30 layers each having an optical thickness nd, wherein n is the refractive index of the material of the layer and d is the thickness, said optical thickness nd being between 0.2 $\lambda_f$ and 0.3 $\lambda_f$, in which $\lambda_f$ is equal to $p \times \lambda$, where $\lambda$ is the desired central wavelength selected from the spectrum emitted by the luminescent material and p is a number between 1.18 and 1.36.

* * * * *